(12) United States Patent
Moneypenny et al.

(10) Patent No.: US 7,375,838 B2
(45) Date of Patent: May 20, 2008

(54) METHOD AND SYSTEM FOR CUSTOMIZED PRINT PUBLICATION AND MANAGEMENT

(75) Inventors: Naomi F. Moneypenny, Houston, TX (US); Steven D. Flinn, Sugar Land, TX (US)

(73) Assignee: ManyWorlds Inc., Houston, TX (US)

( * ) Notice: Subject to any disclaimer, the term of this patent is extended or adjusted under 35 U.S.C. 154(b) by 933 days.

(21) Appl. No.: 10/715,174

(22) Filed: Nov. 17, 2003

(65) Prior Publication Data

US 2005/0105134 A1    May 19, 2005

(51) Int. Cl.
*H04N 1/40* (2006.01)
(52) U.S. Cl. ...................... 358/1.15; 358/468
(58) Field of Classification Search .............. 358/1.9, 358/2.1, 1.15–1.18, 468
See application file for complete search history.

(56) References Cited

U.S. PATENT DOCUMENTS

| 5,132,915 | A | 7/1992 | Goodman |
| 5,499,366 | A | 3/1996 | Rosenberg |
| 6,012,070 | A | 1/2000 | Cheng |
| 6,024,505 | A | 2/2000 | Shinohara |
| 6,795,826 | B2 | 9/2004 | Flinn |
| 6,826,534 | B1 | 11/2004 | Gupta |

FOREIGN PATENT DOCUMENTS

| WO | PCT/US99/19617 | 8/1999 |
| WO | PCT/US00/15126 | 6/2000 |

*Primary Examiner*—Thomas D. Lee
*Assistant Examiner*—Stephen Brinich

(57) ABSTRACT

A method for creating and managing customized print media through an enhanced content management process is disclosed. A print media customer, which may be an individual or organization, is profiled to determine content preferences. Profiling may be based on face-to-face or electronic surveys, Internet usage patterns, buying patterns, or other criteria. Content associated with the preferences is obtained and analyzed. Content affinities, or relationships between the content and other content in a content network, are determined, and may influence the print media produced. A history of the content is maintained, to ensure content is not duplicated. Both substantive and non-substantive content, such as advertising content, is used. Both the content and layout of the print media can be customized.

38 Claims, 8 Drawing Sheets

|    | t1 | t2 | t3 | t4 | t5 | t6 | t7 | t8 | ... | tn | c1 | c2 | c3 | c4 | c5 | c6 | c7 | c8 | ... | cm |
|----|----|----|----|----|----|----|----|----|-----|----|----|----|----|----|----|----|----|----|-----|----|
| t1 | 1 | 0 | .4 | 0 | 0 | .5 | 0 | .3 | ... | 0 | 0 | .3 | 0 | .8 | 0 | 0.4 | 0 | ... | | .4 |
| t2 | 0 | 1 | 0 | .3 | 0 | .2 | 0 | 0 | ... | 0 | .9 | 0 | 0 | 0.2 | .4 | .3 | 0 | ... | | .3 |
| t3 | .3 | .4 | 1 | 0 | 0 | 0 | .6 | .1 | ... | 0 | 0 | 0 | 0 | .2 | .7 | .6 | 0 | .4 | ... | 0 |
| t4 | .1 | .4 | .3 | 1 | .3 | 0 | 0 | 0 | ... | .1 | .1 | 0 | 0 | 0.4 | 0 | .3 | 0 | ... | | .2 |
| t5 | 0 | 0 | .7 | 0 | 1 | .2 | 0 | .3 | ... | 0 | .6 | 0 | 0 | .3 | 0 | 0.1 | .9 | ... | | 0 |
| t6 | .1 | 0 | 0 | 0 | .8 | 1 | .6 | 0 | ... | .1 | 0 | 0 | 0 | 0.4 | 0 | .2 | .3 | ... | | 0 |
| t7 | .2 | .1 | .8 | 0 | 0 | .3 | 1 | 0 | ... | 0 | .5 | 0.2 | 0 | .8 | 0 | 0 | .1 | ... | | .2 |
| t8 | 0 | 0 | 0 | .5 | .5 | 0 | 0 | 1 | ... | .9 | 0 | 0 | 0 | .8 | .2 | 0 | 0 | .8 | ... | 0 |
| ... | | | | | | | | | | | | | | | | | | | | |
| tn | | | | | | | | | | | | | | | | | | | | |
| c1 | 0 | 0 | 0 | .4 | .3 | 0 | .3 | 0 | ... | | 1 | 0.3 | 0 | 0 | .4 | 0 | .2 | .6 | ... | .2 |
| c2 | .3 | .8 | 0 | 0 | .8 | 0 | .2 | 0 | ... | 0 | 1 | .3 | 0 | 0.6 | 0 | .4 | 0 | ... | | .4 |
| c3 | 0 | 0 | 0 | 0 | .4 | .3 | 0 | 0 | ... | .8 | 0 | 1 | .3 | 0 | 0 | .3 | .9 | 0 | ... | 0 |
| c4 | .2 | .1 | .2 | 0 | .7 | 0 | 0 | 0 | ... | 0 | 0 | .3 | 1 | 0 | 0 | 0 | .9 | 0 | ... | 0 |
| c5 | .1 | .3 | 0 | 0 | .2 | .7 | .8 | .2 | ... | 0 | 0 | 0 | .3 | 1 | 0 | 0 | 0 | .8 | ... | .9 |
| c6 | .1 | .2 | 0 | 0 | .6 | 0 | .5 | 0 | ... | .4 | 0 | 0 | .7 | 0 | 1 | .2 | 0 | 0 | ... | .6 |
| c7 | .3 | 0 | .2 | 0 | 0 | .5 | .5 | 0 | ... | .1 | 0 | .2 | 0 | 0 | .3 | 1 | 0 | .2 | ... | 0 |
| c8 | 0 | 0 | 0 | 0 | .7 | .7 | 0 | .4 | ... | .2 | 0 | 0 | .3 | 0 | .7 | 0 | 1 | .1 | ... | 0 |
| ... | .1 | .2 | 0 | 0 | .6 | .6 | 0 | 0 | ... | .3 | 0 | 0 | .2 | .3 | 0 | .8 | 0 | 1 | ... | 0 |
| cm | | | | | | | | | | | | | | | | | | | | |
|    | 0 | .1 | .1 | 0 | .4 | 0 | 0 | .3 | ... | 0 | 0 | .7 | 0 | .6 | 0 | .3 | .3 | .1 | ... | 1 |

METHOD AND SYSTEM FOR CUSTOMIZED PRINT PUBLICATION AND MANAGEMENT

CROSS-REFERENCE TO RELATED APPLICATIONS

The present application claims priority under 35 U.S.C. § 119 to PCT International Application No. PCT/US02/16208, which claimed priority under 35 U.S.C. § 119(e) to U.S. Provisional Patent Application Ser. No. 60/293,207, entitled "A Method and System of Customized Print Publication and Management," filed on May 25, 2001.

BACKGROUND

This invention relates to the publication of customized and personalized newspapers, newsletters, magazines, periodicals, journals, catalogs, books and other printed media.

The current state of the art in the print publishing world is primarily to "broadcast" identical issues of a publication to all customers. Although electronic media, such as Internet sites, allow customization of information for various customer segments and/or individuals, print media has generally remained un-customized. Rather, periodicals, books and other print media are often targeted to a particular market segments in a coarse-grained manner. Prior art in print media customization relates to simple regional customization in newspapers and to some extent periodicals. Minor customization of books is also not unknown. However, the ability to mass customize print media such as newspapers, books, magazines, etc. has not been a reality.

Unfortunately, this coarse-grained approach to the delivery of printed material puts real limits on the value of the print media to its customers, and limits the ability to adequately contextualize print advertising for the consumers of the print media. A by-product of this lack of contextualization is the reduction in the potential value of print media advertising.

Electronic media allows for better customization, and this will become increasingly effective. However, print media will continue to have significant advantages for some time to come. For example, print media is often more convenient than electronic media. It is highly portable, always available, etc. Also, the resolution of print is better than that of display screens, which reduces reading fatigue.

The historic lack of customization of print media is primarily due to the processes and technologies involved. It has simply generally been prohibitively expensive to customize print runs of a particular magazine or book for specific organizations and individuals. This is partly due to the economics of content assembly, layout and printing. It is also partly due to limitations of sufficient, high quality and modular content, and the ability to easily aggregate and understand customer preferences for content, and effective organization and display of content.

However, recent advances in software and printing technologies have enabled a much more economic and extensive customization of print media. For example, leveraging digital press technology, magazine-quality printers are now much less expensive—enabling more cost-effective very short print runs. This has made the "bottleneck" to highly customized and personalized print media to be one of information management rather than that of the mechanics of volume printing. Fortunately advanced information processes will increasingly become available to make true customization of print media feasible. In particular, the Internet, as a mass information management and gathering environment enables the intelligent surveying, aggregation and analysis of print media customers to provide sufficient information to customize print media. In addition, integration of print media and Internet sites can be effected—enabling cross-referencing of content, etc.

The customization of print media provides part of the solution to the problem of "information overload", in that irrelevant information is less likely to be pushed on to readers. The more contextualized and relevant the information delivered to the individual consumer, the higher the value.

This invention provides a comprehensive method for effectively creating and managing customized print media through an enhanced content management process.

SUMMARY OF THE INVENTION

In accordance with the embodiments described herein, a method comprises customizing print media for organizations and individuals. The information for customization may derive from computer-based applications, Internet-based sources, or more traditional, non-electronic survey techniques.

BRIEF DESCRIPTION OF THE DRAWINGS

FIG. 5 is a diagram of a content affinity matrix according to one embodiment of the invention;

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
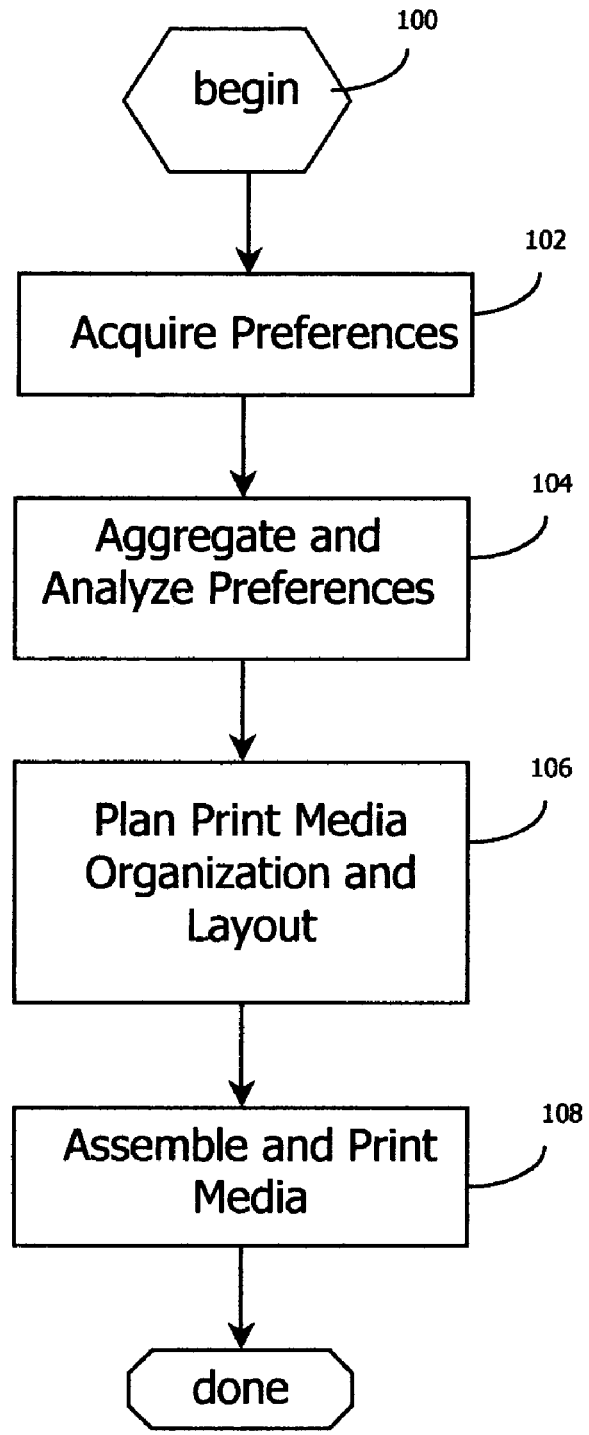
FIG. 1 is a flow diagram of operation of an overall customized publication process according to one embodiment of the invention.

According to one embodiment, FIG. 1 illustrates an overall process for customized print media. Print media may include newspapers, newsletters, magazines, periodicals, journals, catalogs, books, posters and other printed material. Customer preferences with regard to areas of interest and with regard to specific content are captured through an electronic means (block 102). The content may include any printable content such as text and images. The capture of customer preferences may occur through electronic means, such as an Internet site or through non-electronic means, such as mail surveys, telephone interviews, etc.

Once the customer profiling information is obtained, it can then be analyzed for patterns, and preference clusters can be established (block 104). These profiles and preferences may be gathered according to various categorizations, such as affinity group, organization, or geographic region, or they may be gathered at the level of specific individuals.

In one embodiment, the results of the profiling and analysis are used to develop a plan for print media customization (block 106). Decisions may be made based on customer preferences and publishing economics as to how many separate instances of a print medium will be published (block 108).

In producing a customized print media document for the customer, several things are obtained. First, what the print media customer is interested in is identified and denoted as content. Next, the content is analyzed for affinities to other content, content, which may also be of interest to the print media customer. Finally, a print history is maintained to ensure that previously published content is not repeatedly published.

Figure 2:
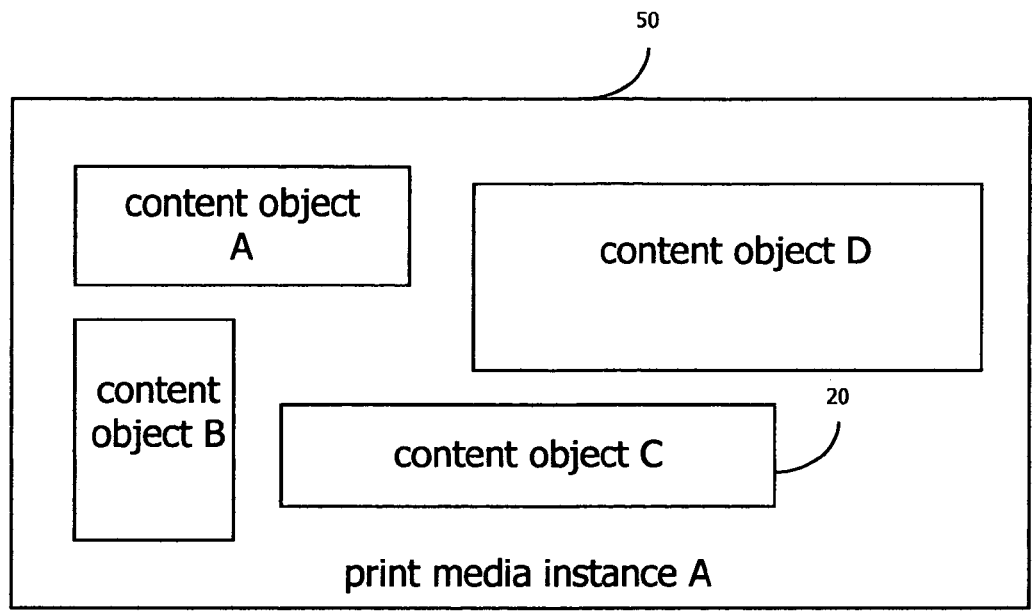
FIG. 2 is a block diagram of two print media instances according to one embodiment of the invention.
Figure 2:
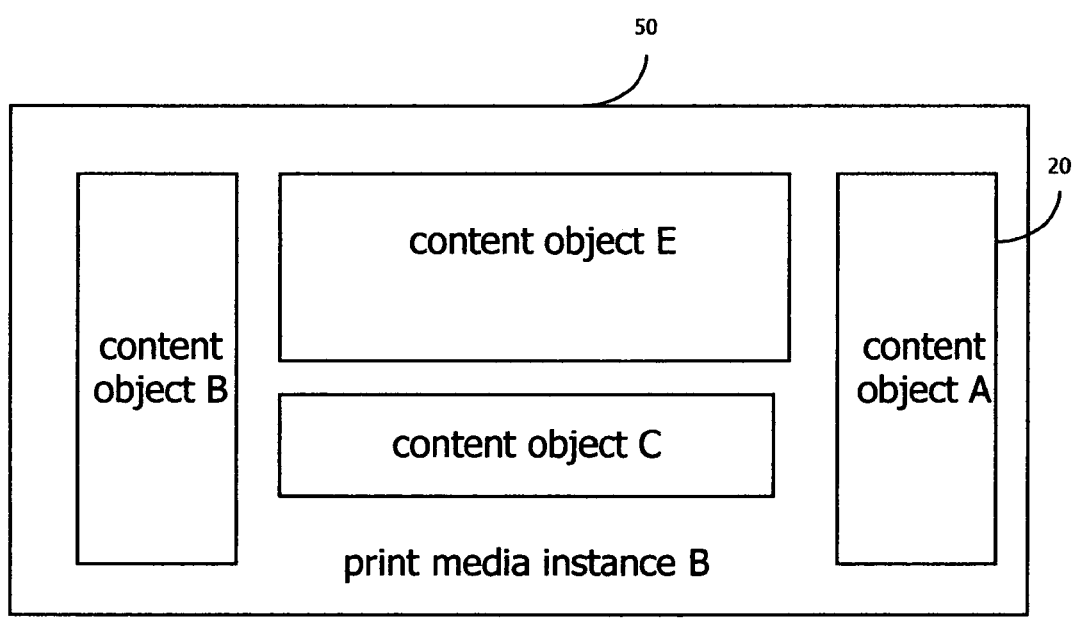

Schematically illustrated in FIG. 2, a print media instance 50 is defined as a unique set of content, shown as content objects 20, arranged in a specific manner, i.e., as a unique layout. Two examples of print media instances are depicted in FIG. 2. Print media instances A and B share content objects A, B, and C, yet the arrangement of the content objects in each instance is unique. Further, the content objects themselves may be uniquely presented, as illustrated by the distinct appearance of content object A within each print media instance. The print media instances may have not necessarily all include the same content objects, as depicted by print media instance A including content object D, while print media instance B does not contain this content object, but does include a different content object, E.

Multiple physical copies of a specific print media instance may be made. Derivative print media instances can be created from an original print media instance, such as when print media is customized for an organization, then further customized for some members of the organization.

The print media instances may be customized according to the preferences of an affinity group or organization, according to a geographic region to which the print media is distributed, or according to the preferences of specific individuals. The content objects comprising the print media instance may include substantive text material, graphics, images, and non-substantive material, such as advertising.

The customization of a particular print media instance may be a combination of customization and personalization among these levels. For example, an individual within an organization may receive a print media instance that is customized for his organization, and then further personalized for him individually.

In one embodiment, a computer system organizes, assembles and prints the customized media instances based on detailed preferences. Advanced printing technology, such as digital press technology, may improve the economics of shorter print runs. In another embodiment, the organization, assembly and printing are conducted manually, or through a combination of manual and automated approaches. In all of these approaches, readers of the print media benefit from content that is more relevant to them than through mass, un-customized distribution approaches.

In addition to the content being more targeted to the customer, the specific organization and layout of the content may also be consistent with reader preferences. For example, content that is of highest interest may be highlighted prominently within the print media instance, while content that is still desired, but is of less relevance, may be relegated to less prominent positions in the print medium.

In one embodiment, the customized print media is printed for the print customer and physically delivered in print form. In another embodiment, the print customer prints the customized print media from an on-line environment on-demand. For example, the on-line environment may be an Internet site from-which the customized print media is downloaded to a user for printing or viewed on a display. Alternatively, the customized print medium may be transmitted by email.

In one embodiment, the customized print media refers to related, supplemental content available electronically—for example, on an Internet site. Likewise, an Internet site may reference specific content available, or that will be available, in associated customized print media instances.

Advertising content may be intelligently delivered within the print media based on customer profiling as well. Both the specific advertising to be included in any given print medium, and its location and other display aspects may be driven by customer profiling information.

Content/Customer Affinity Processes

Figure 3:
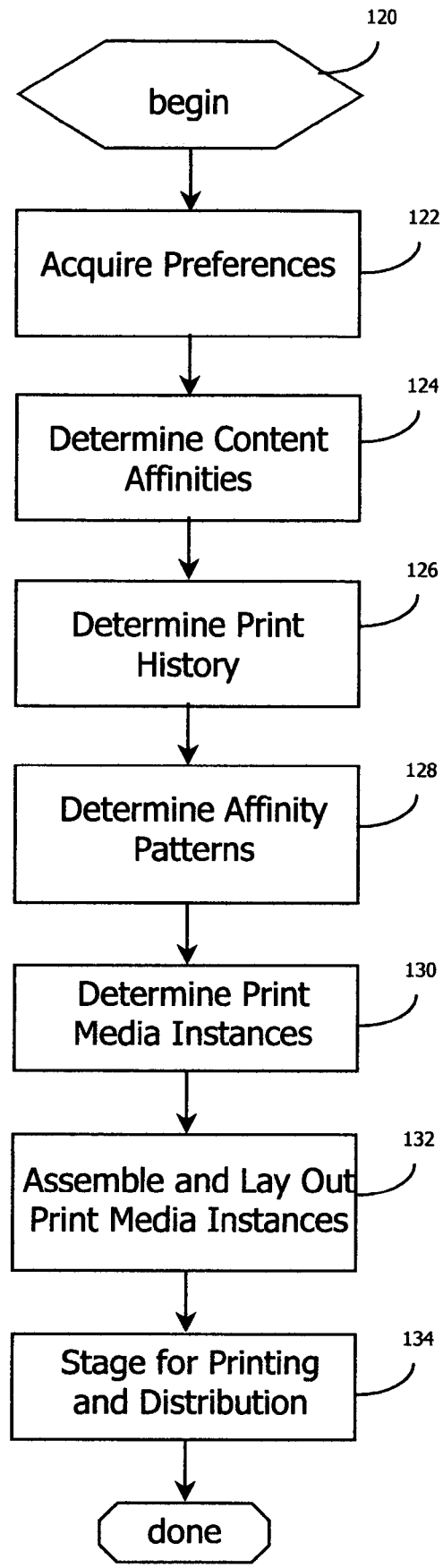
FIG. 3 is a flow diagram of operation of content network-driven approach to an overall customized publication process according to one embodiment of the invention.

The flow diagram of FIG. 3 illustrates an overall process of establishing patterns of relationships among content and then using the content relationships to deliver customized instances of print media. In one embodiment, the content includes computer files, text, documents, articles, images, audio, video, multi-media, software applications and electronic or magnetic media or signals while the print media include newspapers, newsletters, magazines, periodicals, journals, catalogs, books, posters and other printed material.

In one embodiment, the profiling of print consumers or prospective print consumers is conducted to determine content preferences (block 122). The profiling may be conducted through explicit surveys or questionnaires. These may be conducted electronically, such as through Internet sites, or through other information gathering means, such as printed or telephone surveys.

Print consumer profiling may also be done indirectly through the use of buying pattern information. This buying pattern information may be from sources associated with electronic-based purchases, such as through Internet sites, or from sources associated with telephone-based or in-store purchases.

The profiling provides information on the affinity between content and information consumers or sets of information consumers. The affinity between these print media customers and content can be called customer/content affinities, or just customer affinities, for short. The profiling information may also serve to provide information on the degree of relationship among content or sets of content. The overall set of relationships among items of content can be described as a content network.

Figure 4:
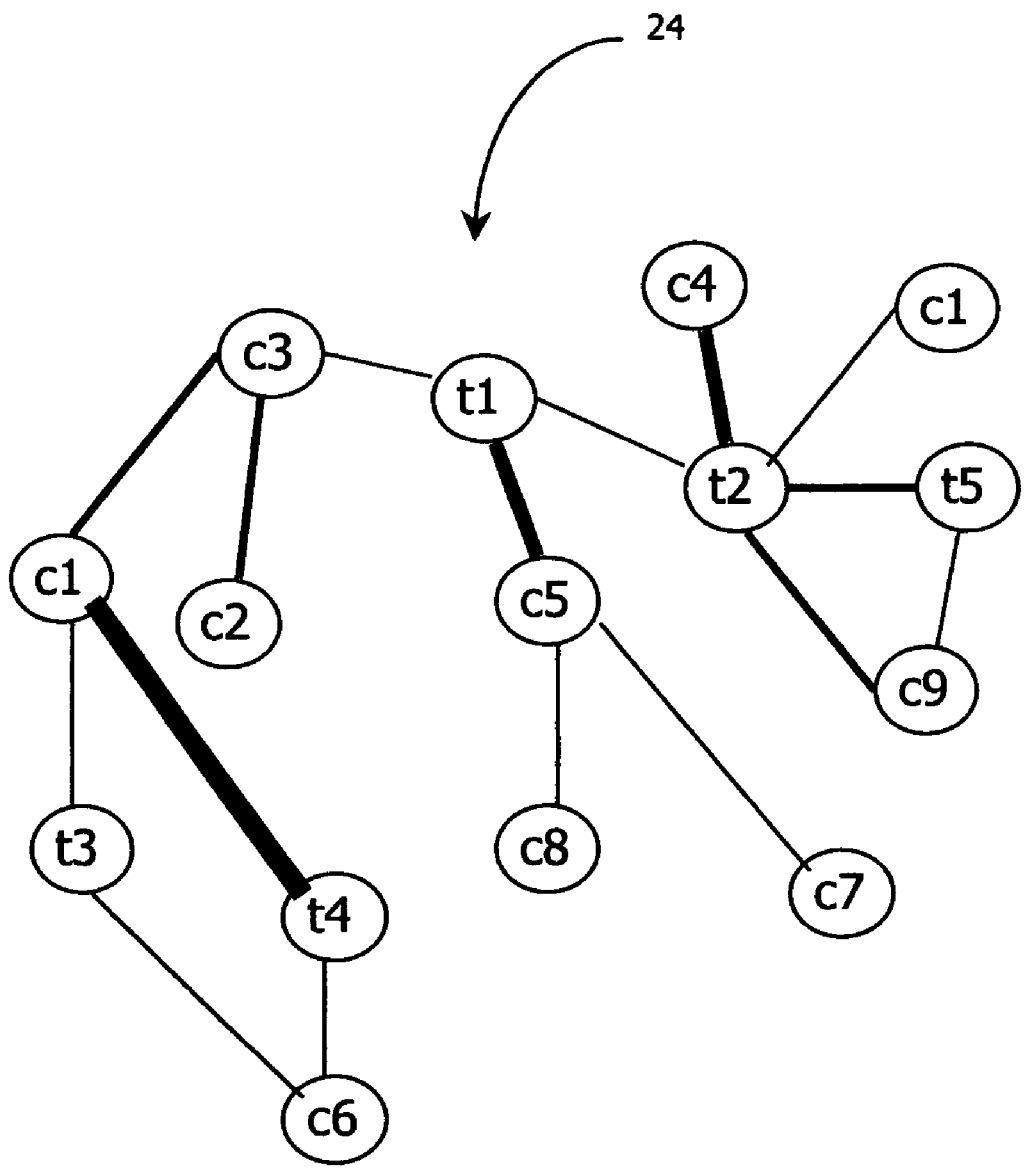
FIG. 4 is a graphical representation of a content network according to one embodiment of the invention.

FIG. 4 illustrates a content network 24, including content items, denoted "cn," where n is a numeral, and topic items, denoted "tn," according to one embodiment. The topics are essentially groups of content. Topics and content may have affinities with other topics and content. The individual items of content in the content network can include advertising as well as non-advertising content.

In one embodiment, the relationships among the content in the content network are normalized to numbers or descriptive symbols. For example, the relationship indicator among content may be a numerical indicator of the relationship between objects. The relationship indicator may be normalized to between 0 and 1, inclusive, where 0 indicates no relationship, and 1 indicates the strongest relationship.

FIG. 5 illustrates an affinity matrix 26 in which all topic and content relationships are displayed in the normalized 0 to 1 format. In one embodiment, one or multiple affinity matrices are used to manage the content network affinities.

In another embodiment, the relationship indicators are expressed using subjective descriptors that depict the strength of the relationship. For example, subjective descriptors "high," "medium," and "low" may indicate a relationship between two items of content. As another example, in FIG. 4, lines of varying thickness are used to represent the degree of relationship between topics and content. Other indicia may be used to describe a relationship between content objects.

Content relationships can also be termed content "affinities", and a set of content affinities can be termed patterns of affinity or affinity patterns. Returning to the flow diagram of FIG. 2, once the preferences of a print publication customer are determined, additional sources of content affinity information are used in developing and maintaining the network of content affinities (block 124). In one embodiment, multiple affinity relationships among content based on different affinity criteria are possible.

In one embodiment, human experts on the content establish the affinities among content (block 128). The content may be organized within a software application or Internet site that may be used for print media customization purposes. Human experts may use their judgments to adjust the affinities over time.

In one embodiment, automated systems establish patterns of affinity among content organized within a software application or Internet site that may be used for print media customization purposes. The automated systems use statistical pattern matching of specific text within individual items of content to establish the level of affinity. In other embodiments, the automated systems use semantic reasoning with respect to text within the individual items of content to establish the level of affinity. The usage patterns of an organization or individual associated with a software application or Internet site may be used to customize the print media instances.

One or all of these approaches of establishing affinities among content, known as content affinities, and affinities among content and print media customers, known as customer affinities, may be employed. When multiple affinity generating approaches are used, general rules of application of these sources of content affinity information are applied. In one embodiment, for example, direct profiling information overrides information from sources such as automated systems and usage patterns.

In one embodiment, a history of content that has been included in print media instances to print customers is retained (block 126). This historical information is merged with the content and customer affinities to ensure that a customer does not receive a specific item of content within their print media more than once. Or, particularly in the case of advertising content, the historical print information may be used to ensure the appropriate level of reuse of advertising content within individual print instances is effected.

The content and customer affinity patterns, combined with print histories, and print instance parameters, may provide the raw data that enables the determination of the specific print media instances to be produced (block 130). One print instance parameter, for example, may be the total number of pages allowed for an individual print media instance. This may be the same or different across print media instances.

In one embodiment, a set of mathematical algorithms is applied to calculate the optimal print media instances based on these inputs. The algorithms ensure that print media customers do not receive a particular content item in more than one print instance, unless that is specifically allowed or desired (e.g., with advertising content). The algorithms search and analyze for clustering of customer and content affinities, and content-to-content affinities. Additional weighting parameters are added to the algorithms to weight the clusterings as desired by the publisher. A limit on the total number of allowable print media instances may guide the algorithms in determining the specific number of print media instances to produce.

In one embodiment, the customer/content affinities directly affect the physical layout of content in a customized print media instance. The most preferred content may be physically arranged so that it is most prominently displayed. For example, in newspaper and newsletter print media, the most preferred content is generally displayed on the front page.

Using the above criteria, the customized print media instance is assembled (block 132). The content affinity patterns may directly, possibly in conjunction with customer customer/content affinities, affect the physical layout of content. Where the affinity patterns indicate a strong affinity among the associated items of content, the corresponding printed content is physically arranged to be close together in the customized print media instance. In one embodiment, reference indicators between individual items of content within the individual customized print media based on the affinity patterns between the content are placed so as to ease the readers' path from one item of content to another.

Fuzzy Content Network Embodiments

In one embodiment, the content within the customized print media is driven by software applications that employ fuzzy content network design. One such application is described in U.S. patent application Ser. No. 09/805,082, entitled "Fuzzy Content Network Management and Access" filed on Mar. 13, 2001, which is hereby incorporated by reference as if set forth in its entirety. In these implementations, the measured relationship between content and topic objects is used to determine the automatic organization of the print media instances' layout.

Figure 6:
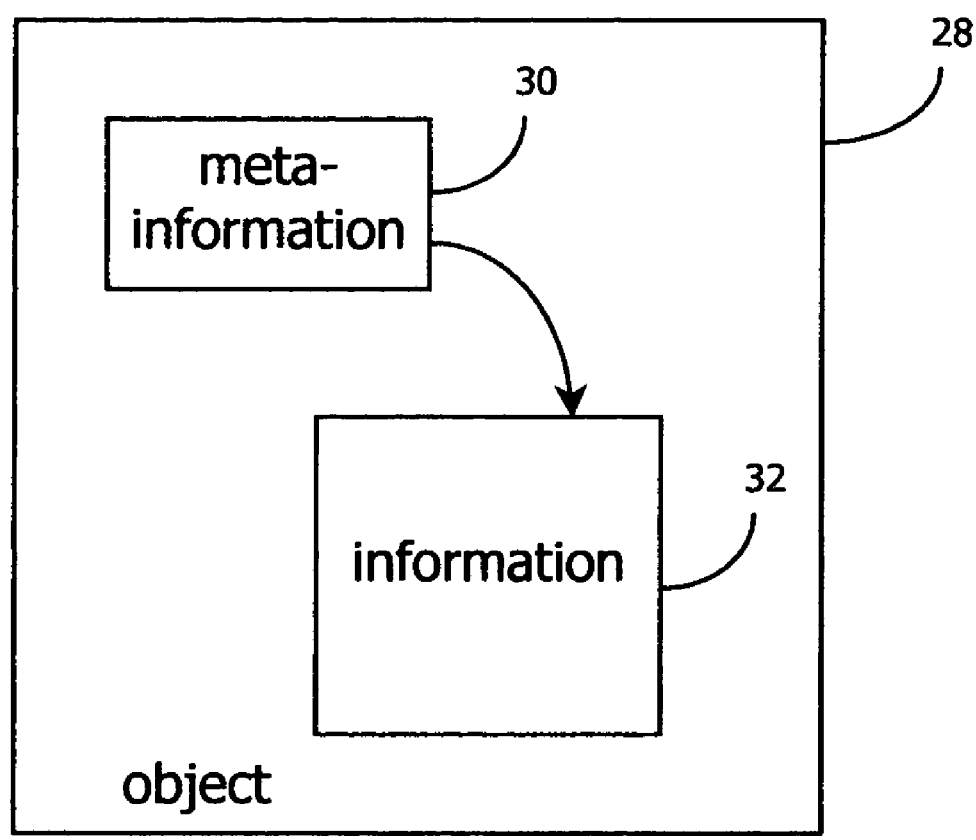
FIG. 6 is a block diagram illustrating encapsulation of content and topic objects according to one embodiment of the invention.

FIG. 6 is a block diagram of an object 28 encapsulating meta-information 30 and information 32, according to one embodiment. The object itself may be a topic or content object. The information 32 may include files, text documents, articles, images, audio, video, multi-media, software, and electronic or magnetic media or signals. Alternatively, the information can be a pointer to information stored elsewhere. The meta-information supplies a summary or abstract of the object, a title, a date of creation, and so on.

The meta-information 30 bound to a topic or content object of the fuzzy content network may be incorporated within the layout of a print media instance, along with the direct information 32 encapsulated in the associated topic or content object.

Figure 7:
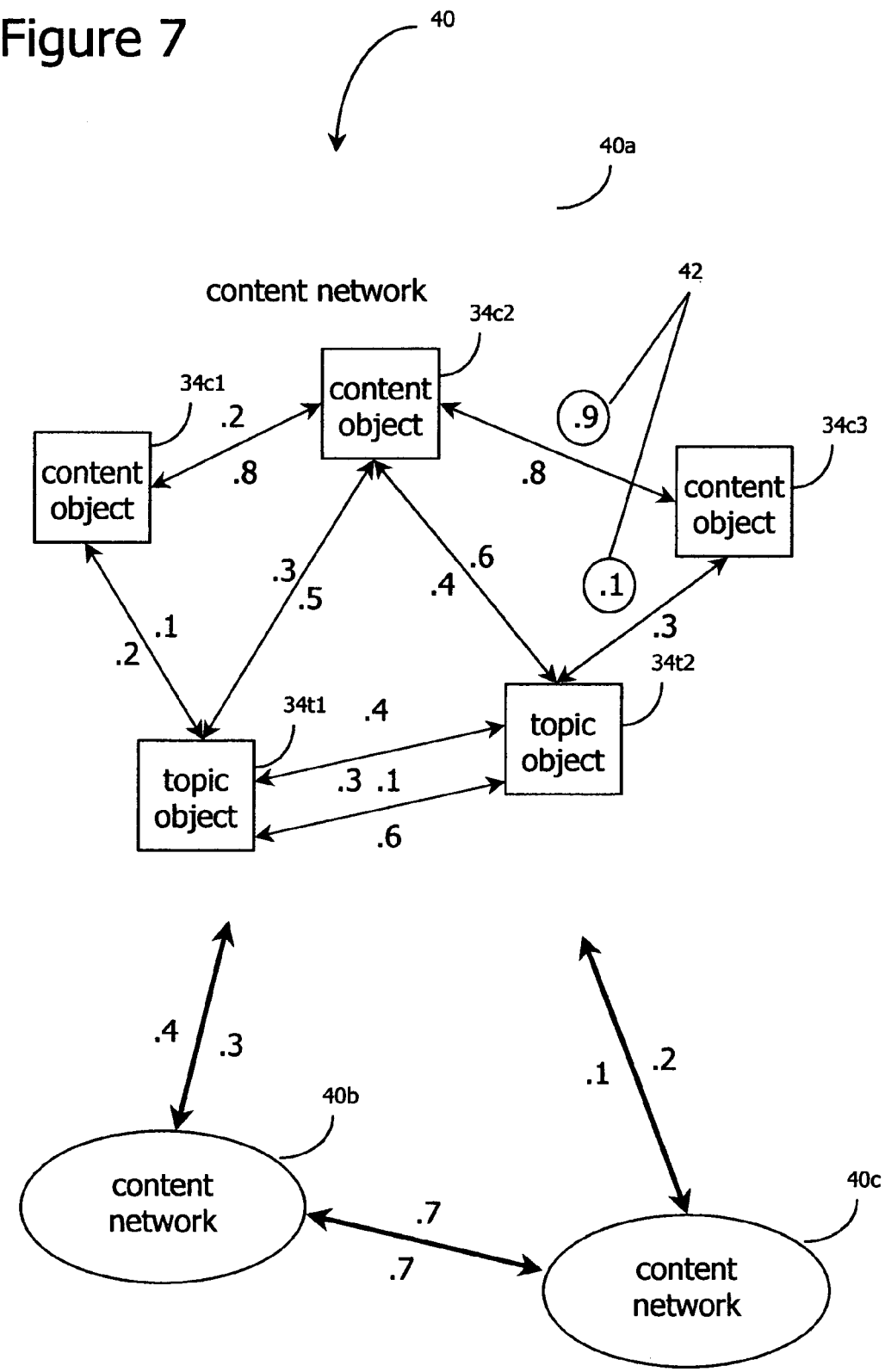
FIG. 7 is a block diagram of a content network according to one embodiment of the invention.

FIG. 7 is a general schematic of a fuzzy content network 40, according to one embodiment. Content sub-network 40*a* is expanded, such that both content objects 34*c* and topic objects 34*t* are visible. In one embodiment, the various objects 34 of the content network 40 are interrelated by degrees, using relationship indicators 42, as illustrated. Each object 34 may be related to any other object 34, and may be related by one or more relationship indicators, as shown. Thus, while information 38 is encapsulated in the objects 34, the information 38 is also interrelated to other information 38 by a degree manifested by the relationship indicators 42.

In one embodiment, the relationship indicator 42 is a numerical indicator of the relationship between objects 34. Thus, for example, the relationship indicator 42 may be normalized to between 0 and 1, inclusive, where 0 indicates no relationship, and 1 indicates a subset relationship. In another embodiment, the relationship indicators 42 are expressed using subjective descriptors that depict the "quality" of the relationship. For example, subjective descriptors "high," "medium," and "low" may indicate a relationship between two objects 34.

Additionally, the relationship indicator 42 may be bidirectional, as indicated by the double-pointing arrows. Further, each double-pointing arrow includes two relationship indicators 42, one for each "direction" of the relationships between objects 34.

As FIG. 7 indicates, the relationships between any two objects 34 need not be symmetrical. That is, topic object 34t1 has a relationship of "0.3" with content object 34c2, while content object 34c2 has a relationship of "0.5" with topic object 34t1.

In some embodiments, content networks 40 are themselves related using relationship indicators 42. For example, in FIG. 7, content sub-network 40a is related to content sub-network 40b and content sub-network 40c, using relationship indicators 42. Likewise, content sub-network 40b is related to content sub-network 40a and content sub-network 40c using relationship indicators 42.

In another embodiment, individual content and topic objects 34 within a selected content sub-network 40a are related to individual content and topic objects 34 in another content sub-network 40b. In yet another embodiment, multiple sets of relationship indicators 42 are defined between two objects 34.

For example, a first set of relationship indicators 42 may be used for a first purpose or be available to a first set of users while a second set of relationship indicators 42 is used for a second purpose or available to a second set of users. In FIG. 7, topic object 34t1 is bi-directionally related to topic object 34t2, not once, but twice, as indicated by the two double arrows. The content network 40 may thus be customized for various purposes and accessible to different user groups in distinct ways simultaneously.

The relationships among objects 34 in the content network 40 as well as the relationships between content networks 40 are modeled after fuzzy set theory, according to one embodiment. Each object 34, for example, is considered a fuzzy set with respect to all other objects 34, which are also considered fuzzy sets. The relationships among objects 34 are the degrees to which each object 34 belongs to the fuzzy set represented by any other object 34. Although not essential, every object 34 in the content network 40 conceivably has a relationship with every other object 34.

In one embodiment, the topic objects 34t encompass, and are labels for, very broad fuzzy sets of the content network 40. The topic objects 34t thus may be label for the fuzzy set, and the fuzzy set may include relationships to other topic objects 34t as well as related content objects 34c. Content objects 34c, in contrast, typically refer to a narrower domain of information in the content network 40.

Print Media Instance Determination and Lay Out

In one embodiment, the affinity patterns of the content determine the references among individual customized print media and related content available in electronic format, such as on an Internet site. Content in the print media may refer to content that is not in the individual print media itself, but has a usage affinity with content accessible on-line. The on-line content referred to may not necessarily be text-based, but can include images, presentations, graphics, audio, video, or interactive applications. In one embodiment, the content includes an Internet Uniform Resource Link (URL) to enable easy access.

The optimization of content to be included in a specific print media instance, its exact arrangement within the print media instance, and internal and external content references may be achieved through manual or automated means. In one embodiment, the optimization process employs mathematical algorithms to optimize each of the customized print media. The algorithms may consider the content affinity patterns and balance the optimization of layout based on these patterns, along with the content "packing" requirements so as conform to the page size and number of pages of a particular customize print instance.

In one embodiment, an automatic table of contents is generated for the specific print media instance based on the specific content included in the print media instance and its layout. An index is generated for the specific print media instance based on the specific content included in the print media instance and its layout.

Additional customization or personalization of individual print instances may be effected. For example, the name of the associated print media customer organization, affinity group or a specific individual (or combinations) may be displayed on the front cover, or possibly throughout a print media instance.

Returning to FIG. 3, in one embodiment, the individual print media instances, with the appropriate number of copies to be produced of each print media instance, are staged for printing (block 134). Delivery information, such as mailing labels, are merged with print media instance information to ensure mailed print media instances are delivered to the appropriate customers.

Figure 8:
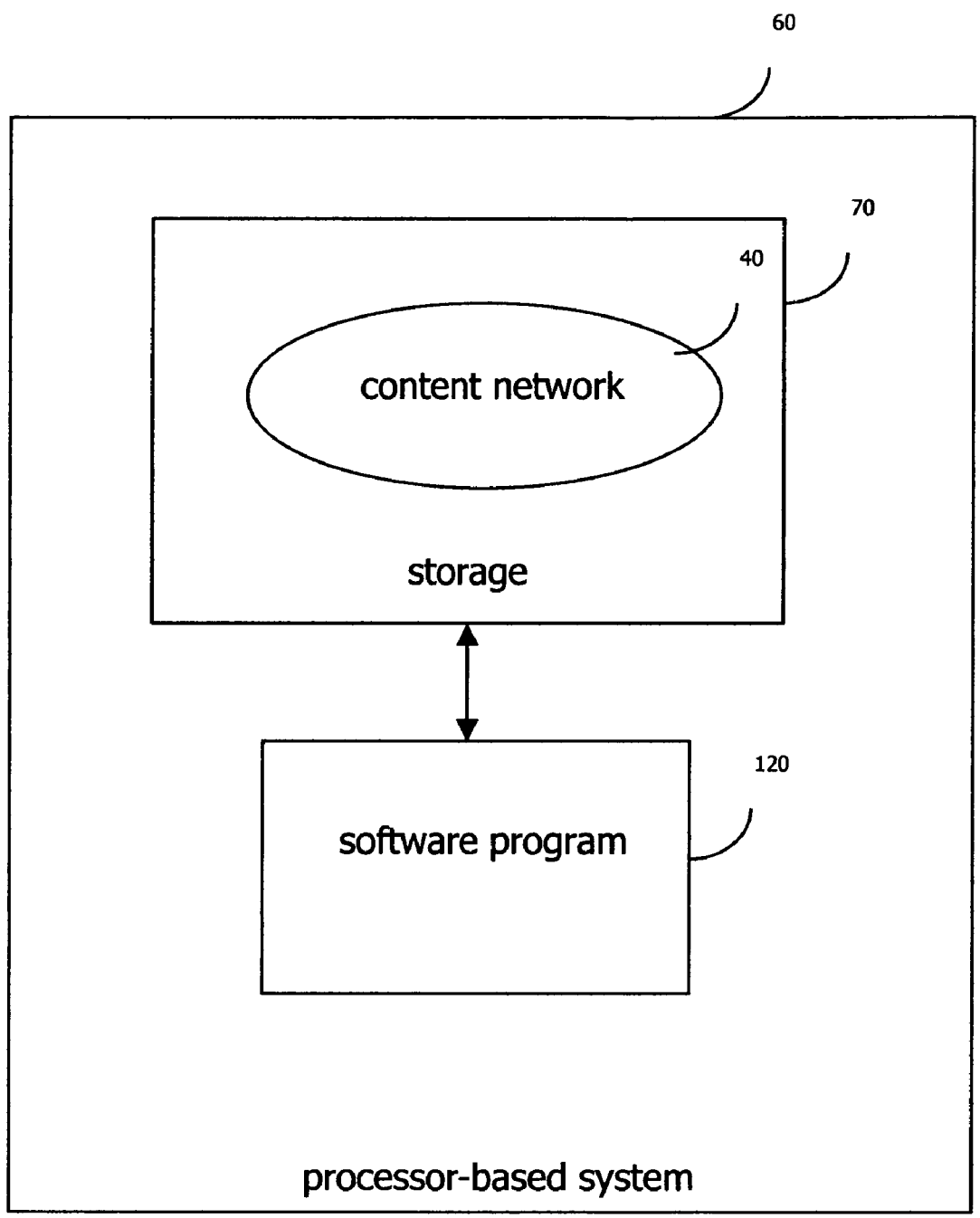
FIG. 8 is a block diagram of a processor-based system for performing the operations of FIG. 3 according to one embodiment of the invention.

The operations of FIG. 3 are performed by a software program running on a processor-based system, according to one embodiment. Such a processor-based system is depicted in FIG. 8. The processor-based system 60 includes storage 70 for maintaining the content network 40. The storage 70 may be a non-volatile storage, such as a hard disk drive, a compact disk read-only memory (CD ROM) drive, magnetic storage, and so on, or a volatile storage medium, such as a memory device.

Although some operations described in FIG. 3 may be performed manually, the software program 120 may process the preferences obtained in producing the print media instance. For further analysis of the preferences, the software program has access to the content network, so that content affinities and affinity patterns may be produced.

While the invention has been described with respect to a limited number of embodiments, those skilled in the art will appreciate numerous modifications and variations therefrom. It is intended that the appended claims cover all such modifications and variations as fall within the true spirit and scope of the invention.

What is claimed is:

1. A computer-based method for customizing print media, comprising:

accessing a plurality of content objects from a content network, wherein an affinity between a first content object of the plurality of content objects and a second content object of the plurality of content objects is generated automatically by a computer-based system based, at least in part, on computer-based usage patterns;

profiling a plurality of print media customers to obtain preferences for the plurality of content objects;

generating a preference cluster comprising a subset of the plurality of print media customers; and producing a print media instance for the print media customer, the print media instance comprising a subset of the plurality of content objects that includes the first content object and the second content object and that is optimized among a plurality of produced print media instances in accordance with the preferences obtained, the print media customer preference cluster, the affinity between the first content object and the second content object, a print media instance history, and a print media instance parameter.

2. The method of claim 1, wherein the print media instance further comprises layout that is consistent with the preferences obtained.

3. The method of claim 1, further comprising:
obtaining a print history of the print media customer, wherein the print history identifies previously published content in one or more print media instances for the print media customer; and
controlling the frequency of previously published content in subsequent print media instances.

4. The method of claim 1, further comprising:
obtaining customer affinities among content and the print media customer; and
using the customer affinities to produce the print media instance.

5. The method of claim 1, wherein the print media is selected from the group consisting of a magazine, a periodical, a newspaper, a newsletter, a book, a poster, a presentation, a graphic, a chart, and a catalog.

6. The method of claim 1, wherein the print media customer is profiled using a survey.

7. The method of claim 6, wherein the survey is conducted by a direct, person-to-person interview.

8. The method of claim 6, wherein the survey is conducted by mail.

9. The method of claim 4, wherein the customer affinities are based upon direct customer surveys.

10. The method of claim 4, wherein the customer affinities are based upon indirect assessments.

11. The method of claim 10, wherein indirect assessments include buying habits.

12. The method of claim 10, wherein indirect assessments include content usage patterns.

13. The method of claim 1, wherein the print media instance is assembled by automatic means.

14. The method of claim 1, wherein one or more computer programs automatically assemble the print media instance.

15. The method of claim 1, wherein the print media customer is an organization.

16. The method of claim 1, wherein the print media customer is an individual.

17. The method of claim 1, wherein the print media customer is both an organization and an individual within the organization.

18. The method of claim 1, further comprising:
customizing advertising content within the print media instance based on the preferences obtained.

19. The method of claim 18, further comprising:
customizing advertising layout within the print media instance.

20. The method of claim 18, wherein advertising content within the print media instance is customized for an organization.

21. The method of claim 18, wherein advertising content within the print media instance is customized for an individual.

22. The method of claim 18, wherein advertising content within the print media instance is customized for an organization and an individual within an organization.

23. The method of claim 1, wherein the content network comprises a plurality of content interrelated by degree.

24. The method of claim 1, further comprising:
formatting the content according to meta-information associated with the content.

25. The method of claim 24, wherein the formatting is derived from the relationships between the plurality of content in the content network.

26. The method of claim 19, wherein the customization of advertising layout within the print media instance is derived from the relationships between the plurality of content in the content network.

27. The method of claim 1, wherein the print media instance is delivered electronically.

28. The method of claim 1, further comprising:
generating customized print media subscriptions from Internet site subscription information.

29. A system, comprising:
means for storing a content network, the content network comprising a plurality of objects, each object storing information, wherein each object is related to each other object by one or more relationship indicators wherein the magnitude of the relationship indicators is derived, at least in part, from computer-based usage patterns; and
means for executing a software program, wherein the software program:
profiles a print media customer to obtain preferences for content;
clusters print media customers according to content preferences;
produces a print media instance for the print media customer, wherein the print media instance comprises a plurality of content objects that is a subset of the content network and that is optimized among a plurality of produced print media instances in accordance with the content preferences obtained, print media preference clusters, the relationship indicators of the plurality of content objects, a print media instance history, and a print media instance parameter.

30. The system of claim 29, wherein the software program further:
selects additional content from the content network based on relationship indicators for the content; and
maintains content affinities comprising the content and additional content for use in the print media instance.

31. The system of claim 29, wherein the print media customer is an individual and the preferences are obtained by conducting a manual survey.

32. The system of claim 29, wherein the print media customer is an organization and the preferences are obtained by monitoring Internet use by the organization.

33. The system of claim 29, wherein the print media customer is both an organization and an individual.

34. The system of claim 29, wherein the print media instance further comprises a layout that is based on the preferences.

35. The system of claim 29, wherein the software program further:
   maintains a content history for the print media customer; and
   controls the frequency of previously published content in subsequent print media instances.

36. The system of claim 32, wherein the organization is defined according to geography.

37. An article comprising a computer-readable medium storing instructions for enabling a processor-based system to:
   store a content network, the content network comprising a plurality of objects, each object storing information, wherein each object is related to each other object by one or more relationship indicators wherein the magnitude of the relationship indicators is derived, at least in part, from computer-based usage patterns;
   profile a print media customer to obtain preferences for content;
   cluster print media customers according to content preferences; and
   produce a print media instance for the print media customer, the print media instance comprising a plurality of content objects that is a subset of the content network and that is optimized among a plurality of produced print media instances in accordance with the content preferences obtained, print media preference clusters, the relationship indicators of the plurality of content objects, a print media instance history, and a print media instance parameter.

38. The article of claim 37, further storing instructions for enabling a processor-based system to:
   obtain a print history of the print media customer, wherein the print history identifies previously published content in one or more print media instances for the print media customer; and
   control the frequency of previously published content in subsequent print media instances.

* * * * *